Figure 3:
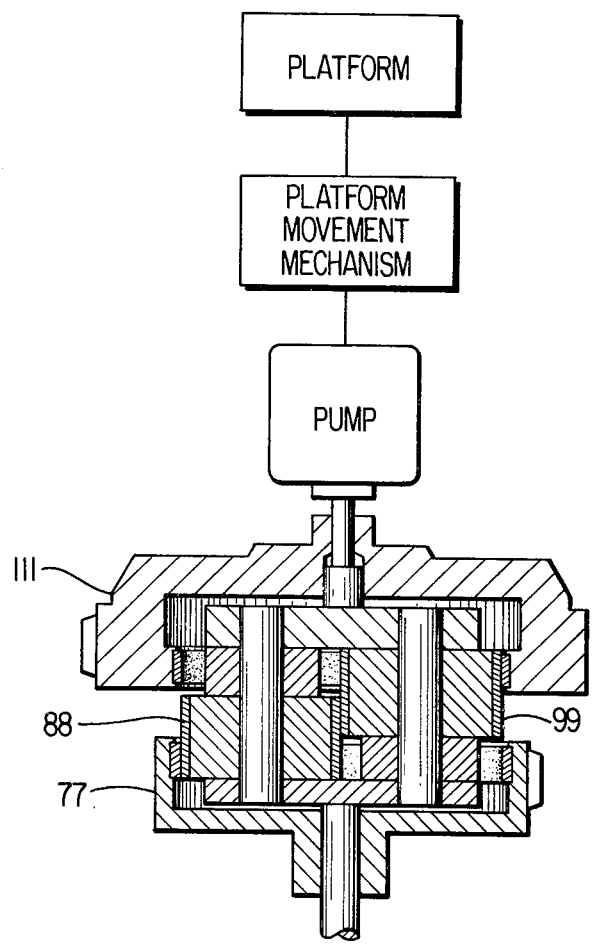

United States Patent [19]

Itey-Bernard

[11] 4,245,712

[45] Jan. 20, 1981

[54] TRANSMISSION SYSTEM FOR THE DRIVE WHEELS OF VEHICLES, NOTABLY LIFT TRUCKS

[75] Inventor: Georges Itey-Bernard, Garches, France

[73] Assignee: Regie Nationale des Usines Renault, Boulogne-Billancourt, France

[21] Appl. No.: 919,903

[22] Filed: Jun. 28, 1978

[30] Foreign Application Priority Data

Jun. 29, 1977 [FR] France .................. 77 19912

[51] Int. Cl.³ .............................. B60K 41/00
[52] U.S. Cl. ...................... 180/70 R; 180/54 C; 74/661
[58] Field of Search ............... 180/70 R, 72, 54 C; 74/661

[56] References Cited

U.S. PATENT DOCUMENTS

| | | | |
|---|---|---|---|
| 1,900,470 | 3/1933 | Smith | 180/54 C |
| 2,257,772 | 10/1941 | Wolf | 180/70 R |

FOREIGN PATENT DOCUMENTS 1580064  9/1970  Fed. Rep. of Germany .

*Primary Examiner*—John A. Pekar
*Attorney, Agent, or Firm*—Fleit & Jacobson

[57] ABSTRACT

Device for transmitting motion to the wheels of a vehicle having drive axles by means of two motors generating the driving power, one motor driving a speed reducing mechanism associated with each drive wheel of the vehicle and the other motor also driving one of the reduction mechanisms, the motors and mechanisms constituting jointly a kinematic chain disposed at the outer periphery of the frame of the vehicle for transmitting the torque to the drive wheels thereof. A member for driving one of the wheels is adapted to transmit the driving power from one input member of the mechanism to an output member of the same mechanism, both input and output members being driven from a separate transmission member, a brake of the driving member being provided for decelerating said wheel.

7 Claims, 3 Drawing Figures

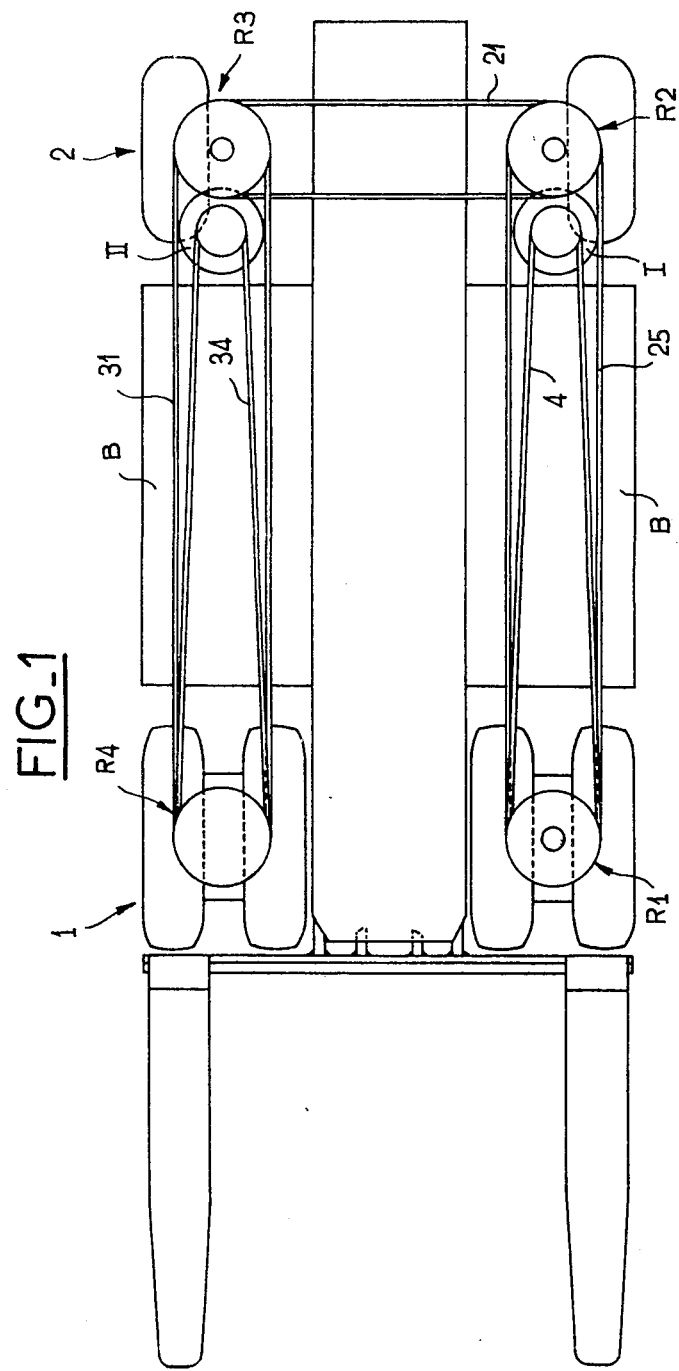

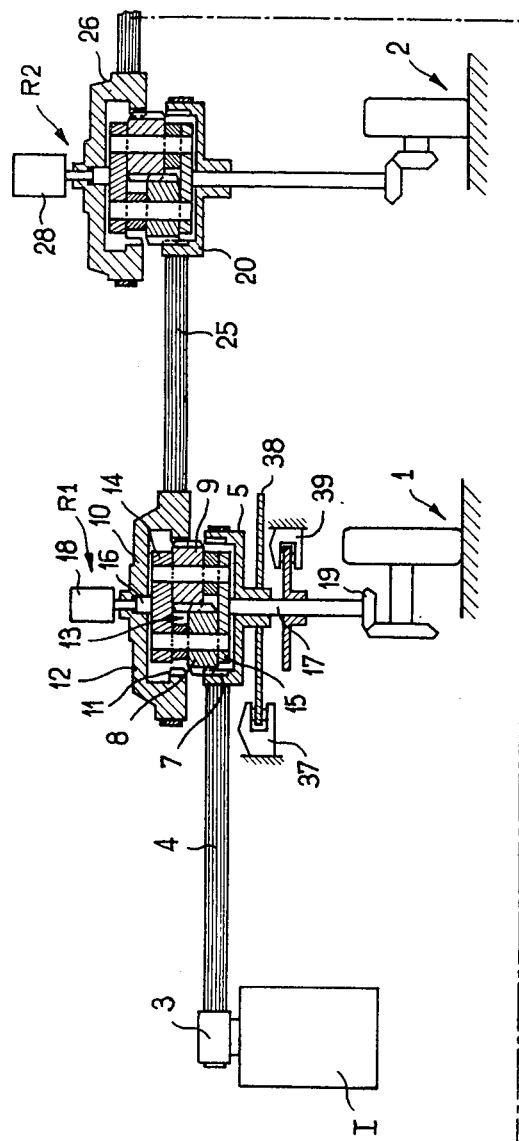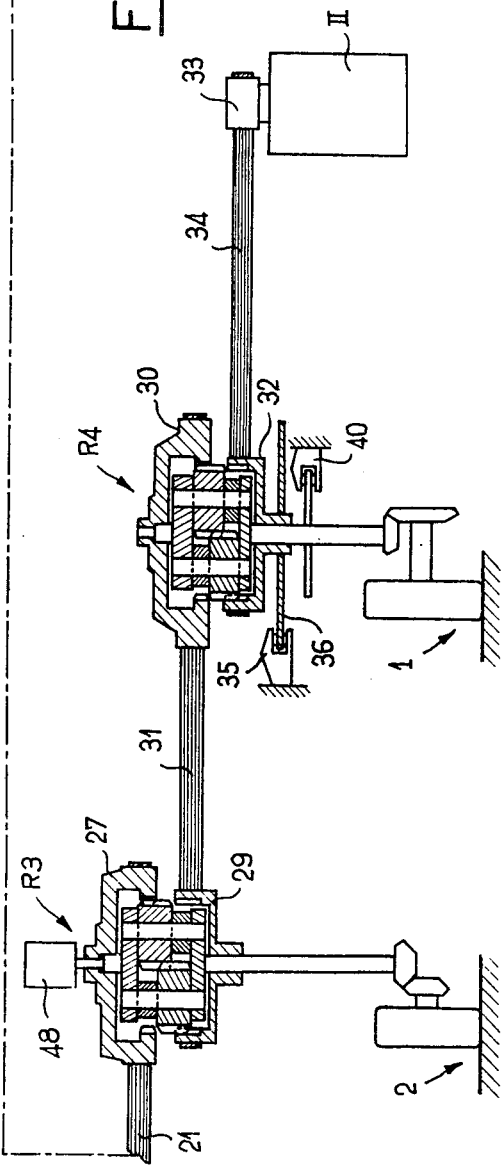
FIG_2

TRANSMISSION SYSTEM FOR THE DRIVE WHEELS OF VEHICLES, NOTABLY LIFT TRUCKS

This invention relates in general to systems for transmitting the torque from a power unit to the drive wheels of a vehicle, for example a lift truck having drive axles, and has specific reference to a transmission system of this character comprising at least one power unit and one speed reducer controlling the rotation of a corresponding drive wheel of the vehicle.

The transmission systems which, in certain vehicles, drive separately each wheel may be classified into two well-defined types: those comprising an epicyclic gear reducer, on the one hand, and those comprising endless belts and cone-pulleys, on the other hand. Both types are objectionable because they are cumbersome, so that the wheel driven thereby must be spaced laterally therefrom. The generally excessive length of these mechanisms is due to the stacking, in the axial direction, of their various component elements comprising the power unit or motor, the normal and parking brakes, as well as a multistage reduction gear. This excessive length characterizing most of hitherto known power and transmission units is particularly detrimental in the case of vehicles such as fork lift trucks of which the overall length and the turning circle must be kept as small as possible in order to ensure their maximum manoeuvrability.

Therefore, the mechanism coupled to a drive wheel should not only have a useful life longer than that of conventional mechanisms but also be so designed and constructed that the train of reduction gears be located as close as possible to the wheel rim; besides, the brakes forming an integral part of the mechanism should be easily accessible to facilitate the maintenance thereof, and in general this mechanism should be relatively economical to manufacture by simplifying its design and also the assembling and disassembling operations.

It is the essential object of the present invention to provide a transmission system comprising a considerable number of identical component elements, and such that it does not occupy the central portion of the vehicle.

It is another object of this invention to provide a two-motor transmission system of which the separate coupling or operation enables the vehicle to operate within the desired speed range.

According to the invention, the motor producing the driving power drives the speed reducing mechanism associated with each drive wheel of the vehicle, one element of this mechanism, which drives said wheel being adapted to transmit the torque from an input member to an output member both driven from a transmission member, a brake member of said driving element being provided for decelerating said wheel, and another motor also producing driving power is likewise coupled to a speed reducing mechanism having the same structure, said motors and speed reducers constituting together a kinematic chain disposed at the outer periphery of the frame of the vehicle for driving all the drive wheels. With the transmission system thus constructed it is possible to dispense with conventional drive axles consisting of wheel shafts associated with a differential gear.

Therefore, the transmission system according to the present invention is particularly suited for driving lift trucks and similar vehicles of which the load supporting device, when inoperative, can be disposed horizontally between the front and rear axles.

Other features and advantages characterizing the transmission system of this invention will appear as the following description proceeds with reference to the accompanying drawing illustrating diagrammatically a typical form of embodiment of the invention. In the drawing:

FIG. 1 is a plane view of the frame of a vehicle equipped with this transmission system, the component elements of the system being shown only diagrammatically, FIG. 2 is a developed view showing the various component elements of the transmission system and FIG. 3 is a schematic view of one embodiment of a speed reducing mechanism and associated equipment used with the present invention.

Referring to the drawing it will be seen that the vehicle illustrated therein is a fork lift truck of the type comprising four drive wheels, i.e. two front wheels forming an axle 1 and two rear wheels forming an axle 2.

A power unit (which may be an electric motor) I producing the driving power (it would not constitute a departure from the basic principle of the invention to use a thermal or hydraulic motor or engine) is supplied with energizing current from a storage battery B and anchored to the truck frame. This motor has a pulley 3 mounted on its output shaft and adapted to transmit via a flexible transmission member such as a driving endless belt 4, another pulley 5 constituting the input member of a speed reducing mechanism designated generally by the reference symbol $R_1$. This speed reducer $R_1$ to be described in detail hereinafter is associated with the left-hand front wheel of axle 1. Similarly, other speed reducing mechanisms $R_2$, $R_3$ and $R_4$ having the same structure as mechanism $R_1$ are associated with the other wheels, such as the left-hand and right-hand rear wheels of rear axle 2 and the right-hand front wheel of front axle 1, respectively. Since the speed reducing mechanisms $R_2$, $R_3$ and $R_4$ are identical with mechanism $R_1$, only the latter will now be described in detail.

This mechanism $R_1$, as clearly shown in FIG. 2, comprises essentially an input member 5 constituting with its outer peripheral portion the driving pulley; however, the internal portion of this pulley constitutes an internally toothed annulus in meshing engagement with a planet wheel 8. Another planet wheel 9 meshes with planet wheel 8 and also with the output member 10 also consisting of an internally toothed annulus 11 and of a pulley constituting the driven pulley 12. Both planet wheels 8, 9 are carried through corresponding shafts by a planet carrier 13 consisting essentially of a pair of flanges 14, 15 in which the shafts of planet wheels 8, 9 are mounted.

A pair of opposed shafts 16, 17 constituting the means for journalling and supporting the internally toothed annuli 11, 7 are rigidly fastened to the flanges 14, 15 and extend axially inwards of the mechanism for the purpose of driving an auxiliary pump 18 and the bevel pinion 19 driving in turn the left-hand wheel of front axle 1. The pump 18, giving a relatively reduced volumetric output, delivers hydraulic fluid to auxiliary circuits such as the servo-steering mechanism and the circuit means controlling the various disk-brakes. Preferably, this pump 18 is mounted on the mechanism $R_1$ because the latter is constantly coupled to the motor I of which the energization is discontinued during the handling and manoeuvering of the fork lift truck.

Each speed reducing mechanism $R_2$ and $R_3$ drives a pump 28, respectively 48, in a manner similar to that of mechanism $R_1$.

It is obvious that the driving pulley 5 transmits to the driven pulley 12 the entire torque and the tangential effort, since the internally toothed annuli 7, 11 and the corresponding planet wheels 8, 9 are identical.

The fact that the direction of rotation of pulley 5 is the reverse of that of pulley 12 is evidenced by the kinematics of this mechanism.

The velocity of rotation of the planet carrier is proportional to the velocity of rotation of the corresponding wheel of the vehicle.

Due to the use of identical toothed annuli 7, 11 and likewise identical planet wheels 8, 9, the velocity of rotation of pulley 5 is also equal to that of the pulley 12 when the planet carrier is stationary.

The driven pulley 12 of mechanism $R_1$ is coupled mechanically to the driving pulley 20 of mechanism $R_2$ through the transmission member shown herein in the form of an endless belt 25.

Similarly, the driven pulley 26 of mechanism $R_2$ is coupled mechanically to the driving pulley 27 of mechanism $R_3$ through another endless belt 21.

The driven pulley 29 of mechanism $R_3$ is coupled mechanically to the driving pulley 30 of mechanism $R_4$ by means of another transmission belt 31.

Finally, the driven pulley 32 of mechanism $R_4$ is coupled mechanically through a belt 34 to the driving or output pulley 33 of an electric motor II energized with current supplied by the storage battery B. The electric motor II is also anchored to the truck frame.

It will be seen that the mechanisms $R_1$, $R_2$, $R_3$ and $R_4$ are coupled with one another through flexible transmission members consisting of various endless belts forming together a U-shaped pattern.

The connections illustrated in the drawing provide the following couplings: the front left-hand wheel to the rear left-hand wheel via belt 25; the rear left-hand wheel to the rear right-hand wheel via belt 21; and the rear right-hand wheel to the right-hand front wheel via belt 31. The chief advantage deriving from this kinematic lies in the fact that any direct connection between the front wheels of the vehicle is avoided.

The transmission system operates as follows:

If the positive direction of rotation is chosen for motor I, the pulley 3 and driving pulley 5, the driven pulley 12 and the driving pulley 20 of mechanism $R_2$ rotate in the negative direction. From this preliminary it is clear that the planet carriers of mechanisms $R_1$ and $R_2$ rotate in opposite directions.

Bevel pinions such as 19, properly mounted and positioned on the planet carrier shafts 17 drive the truck wheels in the same direction.

(1) Starting

The planet carrier assembly remains stationary since the truck wheels do not rotate.

The velocity of rotation of the driving pulleys is transmitted to the driven pulleys while changing the direction of rotation of the pulleys. The non-energized motor II will thus rotate at the velocity of motor I if the pulleys 3 and 33 have the same diameter. The inertia of motor II generates a reaction torque applied to the planet carriers of the four mechanisms $R_1$ to $R_4$. In general, this reaction torque of motor II will not be sufficient for starting the truck. However, the latter will start when the driven pulley 32 of mechanism $R_4$ is held against movement by a disk brake 35 of which the braking effort is applied to a disk 36 rigid with the driven pulley 32.

Similarly, the starting may be obtained through motor II, the other motor I being de-energized. To facilitate this starting the driving pulley 5 of mechanism $R_1$ may be held against rotation by a disk brake 37 of which the braking effort is applied to a disk 38 rigid with the driving pulley 5.

The reduction gear ratio obtained between the motor II and the mechanism $R_4$, or between the motor I and the mechanism $R_1$, and the gear ratio obtained through the bevel gears 19 already permit of driving the truck on level ground by means of a single motor until the truck speed thus obtained corresponds to one-half of the maximum speed. According to a preferred form of embodiment of the present invention, the reduction ratio provided by the four series-connected reduction mechanisms $R_1$, $R_2$, $R_3$ and $R_4$ is 1:8 of the initial velocity of the energized driving motor, each mechanism being capable of reducing the input speed by one-half.

A numerical example based on rotational speeds of 3,000 r.p.m. for the motor and 375 r.p.m. for each planet carrier will prove very simply that the second motor remains stationary when the truck travels at half-speed on level ground.

(2) Both motors I and II revolve at the same speed N but in opposite directions.

The driving pulleys 5 and 32 of mechanisms $R_1$ and $R_4$ respectively rotate at the motor speed (the motors I and II rotating at the same speed, i.e. 3,000 r.p.m. in this example given of course by way of illustration, not of limitation). If the velocity of rotation of the planet carrier is 750 r.p.m. when the truck travels at maximum speed along a straight course, a simple demonstration will evidence the fact that the speed of the driven pulley 26 and the driving pulley 27 is zero.

For instance, taking into account the numerical data cited in the Specification by way of example, the motor rotates at 3000 r.p.m., whereas the velocity of rotation of each planet carrier is 750 r.p.m. The driving pulleys (5, 32) of mechanisms $R_1$ and $R_4$ rotate at 3000 r.p.m., i.e., the velocity of rotation of the motors.

If, by assumption, the driven pulley 5 rotates along the positive direction, the driven pulley 12 rotates along the negative direction (see kinematic chain from 5 to 12).

Should the indentations of the driven pulley 5 and of driven pulley 12 have the same number of teeth, the Willis formula applied to this peculiar case would be as follows:

$$(\omega_5 - u/\omega_{12} - u) = K, \text{ i.e., } (3000 - 375/\omega_{12} - 375) = 1$$

As a result, $\omega_{12}$ (velocity of the driven pulley)=2250 r.p.m. However, the transmission by means of belt 25 activates the driving pulley 20 of mechanism $R_2$ at a velocity of 2250 r.p.m. When applying the Willis formula to mechanism $R_2$, one obtains the velocity of driven pulley 26 along the positive direction as follows:

$$(2250 - 375/\omega_{26} - 375) = -1, \text{ i.e.,}$$
$$\omega_{26} = 2250 - 2(375) = 1500 \text{ r.p.m.}$$

The same calculation process may be applied either to mechanism $R_3$ as to define the velocity of driven pulley 26 (i.e., $1500 - 2(375) = 750$ r.p.m.) rotating along the negative direction or to mechanism R4, the velocity of the driven pulley 32 thereof being nil.

When motor II rotates at a speed of 3000 r.p.m., the velocities of the planet carriers will be doubled at 750 r.p.m.

According to the previous calcuation processes, one can determine the velocities of pulley 12 (i.e., 3000−750 −1500 r.p.m.) and of pulley 26 (i.e., 1500−2(750)=0).

When motor II rotates at 3000 r.p.m., driven pulley 32 rotates at the same speed and the driving pulley 30 at 1500 r.p.m. (3000−(750)2).

Further, the velocity of pulley 26 in mechanism R3 is nil (i.e., 1500−2(750)=0).

Thus, it has to be noted that belt 21 remains stationary when the vehicle is moving along a straight path under the driving force of the two motors.

If the pumps 28 and 48 control the lifting of a load platform operatively connected to the truck frame, it will be seen that it is not possible to control or actuate the load carrying platform when the truck travels at maximum speed along a straight course. Therefore, the truck equipped with the transmission mechanism of this invention will improve considerably the safety of operation of the truck while affording substantial savings in energy since the pumps 28 and 48 are stopped automatically. However, it is admitted that the upward movement of the load supporting platform can take place until the truck attains 50% of its maximum speed with a single motor and that the load supporting platform can be lifted rapidly when the truck is stationary, with both motors I and II revolving as before at the same speed and in opposite directions.

It is clear that before lifting the load supporting platform it will be necessary to lock the wheels of the vehicle. For this purpose, two disk brakes 39, 40 associated with the shafts 17, respectively, of reduction mechanisms R1 and R4 will prevent the front wheels from rotating.

However, it will be possible to release the brakes 39, 40 during the lifting of the load for obtaining a controlled forward movement of the truck as frequently required during handling operations.

FIG. 3 schematically illustrates a speed reducing mechanism having annuli 77 and 111 bearing on a rolling path for friction rollers 88 and 99. A pump is connected to a flange of a planet carrier having shafts carrying the rollers 88 and 99. The pump is connected to a platform movement mechanism that controls movement of a load carrying platform.

(3) Reversing the direction of travel.

The direction of travel of the truck is reversed automatically by de-energizing the motor I and energizing the previously stationary other motor II, after reversing its direction of rotation. This change in the motor energization can take place even while the truck is travelling in the forward direction and is not detrimental to the motor operation. The direction in which the torque is transmitted from motor II to motor I will start the truck in reverse after applying the brake 37.

From the above description of the transmission system and its mode of operation, it appears clearly that the invention has several particularly advantageous features.

In fact, a lift truck having four drive wheels is obtained at a relatively low cost by using light-weight transmission members of relatively reduced dimensions.

The use of two identical traction motors mounted independently of each other at the two ends of the kinematic chains permits of adjusting the driving power to the level required for operating the truck under any circumstances.

In addition, the use of this specific mounting permits of operating the motors at different speeds for a same torque.

This particular use of the transmission system, through the proper selection of the dimensions of the pulleys and pinions, permits of selecting at will the reduction ratios between the motors and the speed reducing mechanisms for increasing or decreasing the time period during which the truck is driven either at its maximum speed or at a reduced speed.

With this transmission system it is also possible to obtain under very economical conditions many reduction ratios having relatively small differences between one another, without appreciably modifying the vehicle acceleration, as would be obtained by using an electronic motor control system but at the cost of considerable complications.

It would not constitute a departure from the basic principle of the invention to replace the flexible transmission comprising an endless belt by a hydrostatic coupling or transmission chains, or shafts carrying bevel return pinions at their ends.

The device illustrated and described herein by way of example should not be construed as limiting the present invention. Thus, notably, reduction mechanisms in which the epicyclic gears are replaced by cylindrical friction rollers movable between coaxial races may be contemplated.

It may also be noted that the brakes 39, 40 and 35, 37 are preferably of the disk type since the transmission system greatly facilitates the use of such brakes due to the presence of vertical shafts 17 connecting the reduction mechanisms to the bevel pinions 19.

The velocity of shaft 17 is reduced sufficiently to permit the use of disks of relatively small dimensions adapted to be disposed externally of the corresponding wheel to be braked.

What is claimed as new is:

1. In a device for transmitting motion to drive wheels of a vehicle having drive axles; the device having two motors generating driving power, speed reduction mechanisms operatively connected with each driving wheel, and means for connecting said motors with selected ones of said reduction mechanisms; the motors, reduction mechanisms, and connecting means forming a kinematic chain disposed at the outer periphery of a frame of the vehicle for transmitting torque to the drive wheels, the improvement wherein each of said speed reduction mechanisms comprises:

an input member formed as a pulley;
an output member formed as a pulley; and
driving means operatively associated with the input and output members for driving the drive wheel and for transmitting driving power from the input to output member of the same mechanism;
wherein said connecting means includes separate transmission members for connecting an output member of one reduction member with an input member of another reduction member, the pulleys of different ones of said reduction mechanisms being coupled to one another and to said motors by said connecting means; and
wherein a brake acts on at least one of said driving means for decelerating said wheels, said input member and said output member of the reduction mechanism having shafts of a planet carrier disposed therebetween, one shaft of a planet carrier of one of said speed reduction mechanisms carrying a pinion driving a vehicle wheel and a brake disk of the brake associated with the wheel.

2. The improvement as set forth in claim 1, wherein the input members of the reduction mechanisms directly driven by the motors carry brake disks for decelerating their corresponding wheels.

3. The improvement as set forth in claim 1, wherein one of the shafts of the planet carrier of one of said speed reduction mechanisms carries a hydraulic pump driving the lifting movements of a load supporting platform of the vehicle.

4. The improvement as set forth in claim 1, wherein each of said input members and each of said output members of said speed reduction mechanisms comprise an annulus engaged by planet wheels in mutual contact.

5. The improvement as set forth in claim 4, wherein said annulus comprises races engaged by friction rollers acting as planet wheels.

6. The improvement as set forth in claim 4, wherein the input and output annuli are identical and said planet wheels of said speed reduction mechanism are identical.

7. The improvement as set forth in claim 1, wherein said motors are electric motors.

* * * * *